(12) United States Patent
Atsuumi

(10) Patent No.: US 7,616,384 B2
(45) Date of Patent: Nov. 10, 2009

(54) ZOOM LENS AND IMAGING APPARATUS

(75) Inventor: Hiromichi Atsuumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/209,406

(22) Filed: Sep. 12, 2008

(65) Prior Publication Data
US 2009/0073572 A1 Mar. 19, 2009

(30) Foreign Application Priority Data
Sep. 14, 2007 (JP) ............................. 2007-239913

(51) Int. Cl.
G02B 15/14 (2006.01)
G02B 15/02 (2006.01)
G02B 15/08 (2006.01)

(52) U.S. Cl. .................. 359/676; 359/675; 359/683

(58) Field of Classification Search ............. 359/672, 359/673, 674, 675, 676, 683
See application file for complete search history.

(56) References Cited

U.S. PATENT DOCUMENTS

| 5,233,454 | A  | 8/1993  | Sakuma et al.  |
|-----------|----|---------|----------------|
| 5,355,244 | A  | 10/1994 | Suzuki et al.  |
| 5,408,095 | A  | 4/1995  | Atsuumi et al. |
| 5,426,298 | A  | 6/1995  | Sakuma et al.  |
| 5,459,601 | A  | 10/1995 | Suzuki et al.  |
| 5,475,522 | A  | 12/1995 | Itabashi et al.|
| 5,504,613 | A  | 4/1996  | Itabashi et al.|
| 5,684,618 | A  | 11/1997 | Atsuumi        |
| 6,078,419 | A  | 6/2000  | Atsuumi        |
| 6,198,563 | B1 | 3/2001  | Atsuumi        |
| 6,388,792 | B1 | 5/2002  | Atsuumi et al. |
| 6,417,509 | B1 | 7/2002  | Atsuumi et al. |
| 6,448,998 | B1 | 9/2002  | Suzuki et al.  |
| 6,509,995 | B1 | 1/2003  | Suzuki et al.  |
| 6,525,885 | B2 | 2/2003  | Ohashi         |
| 6,595,985 | B1 | 7/2003  | Sakai et al.   |
| 6,596,985 | B2 | 7/2003  | Sakai et al.   |
| 6,606,179 | B2 | 8/2003  | Suzuki et al.  |
| 6,697,183 | B2 | 2/2004  | Atsuumi et al. |
| 6,771,407 | B2 | 8/2004  | Hayashi et al. |
| 6,781,729 | B2 | 8/2004  | Suzuki et al.  |

(Continued)

FOREIGN PATENT DOCUMENTS

JP        08-248318        9/1996

(Continued)

Primary Examiner—Scott J Sugarman
(74) Attorney, Agent, or Firm—Dickstein Shapiro LLP

(57) ABSTRACT

A zoom lens includes, in order along an optical axis from a side nearest to a photographic subject to an imaging site, a first lens group I that comprises a positive refraction index and is anchored in place when performing a magnification of an image, a second lens group II that comprises a negative refraction index, a third lens group III that comprises a positive refraction index, a fourth lens group IV that comprises a positive refraction index, a fifth lens group V that comprises a negative refraction index, and a sixth lens group VI that comprises a positive refraction index, wherein, when magnifying from a wide angle end to a telephoto end, the magnification thereof is performed by moving the second lens group II, the fourth lens group IV, and the fifth lens group V, at a minimum, the first lens group I comprises a reflective optical element, which is for refracting a light path therein, an additional lens group VII, comprising a negative refraction index, is interposed between the lens groups of the zoom lens as an additional lens group thereof, at a minimum, and a magnification to a long focal distance that is even longer than the telephoto end is performed thereby.

8 Claims, 8 Drawing Sheets

U.S. PATENT DOCUMENTS

| | | |
|---|---|---|
| 6,785,028 B1 | 8/2004 | Atsuumi et al. |
| 6,791,729 B2 | 9/2004 | Atsuumi et al. |
| 6,800,845 B2 | 10/2004 | Sakai et al. |
| 6,801,351 B2 | 10/2004 | Suzuki et al. |
| 6,829,104 B2 | 12/2004 | Suzuki et al. |
| 6,937,371 B2 | 8/2005 | Hayashi et al. |
| 6,961,164 B2 | 11/2005 | Atsuumi |
| 6,999,208 B2 | 2/2006 | Suzuki et al. |
| 7,006,120 B2 | 2/2006 | Sakai et al. |
| 7,012,724 B2 | 3/2006 | Atsuumi et al. |
| 7,038,822 B2 | 5/2006 | Sakai et al. |
| 7,050,210 B2 | 5/2006 | Atsuumi et al. |
| 7,068,407 B2 | 6/2006 | Sakai et al. |
| 7,106,483 B2 | 9/2006 | Hayashi et al. |
| 7,126,737 B2 | 10/2006 | Atsuumi et al. |
| 7,154,651 B2 | 12/2006 | Atsuumi et al. |
| 7,164,516 B2 | 1/2007 | Hayashi et al. |
| 7,215,354 B1 | 5/2007 | Sakai et al. |
| 7,236,281 B2 | 6/2007 | Hayashi et al. |
| 7,271,823 B2 | 9/2007 | Izumi et al. |
| 7,298,537 B2 | 11/2007 | Hayashi et al. |
| 7,312,931 B2 * | 12/2007 | Sano et al. .................. 359/683 |
| 2005/0280884 A1 | 12/2005 | Atsuumi et al. |
| 2006/0238845 A1 | 10/2006 | Atsuumi et al. |
| 2007/0206261 A1 | 9/2007 | Hayashi et al. |
| 2008/0043307 A1 | 2/2008 | Hayashi et al. |
| 2009/0040621 A1 * | 2/2009 | Kudo ......................... 359/684 |
| 2009/0067060 A1 * | 3/2009 | Sudoh ......................... 359/683 |

FOREIGN PATENT DOCUMENTS

| | | |
|---|---|---|
| JP | 2001-324676 | 11/2001 |
| JP | 3570253 | 7/2004 |

* cited by examiner

FIG. 1A WIDE ANGLE END
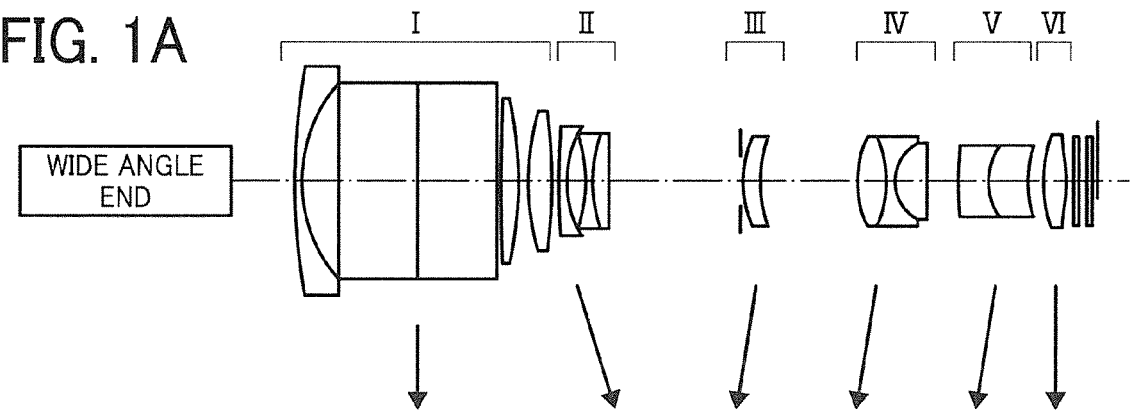
FIG. 1B MEDIUM FOCAL DISTANCE
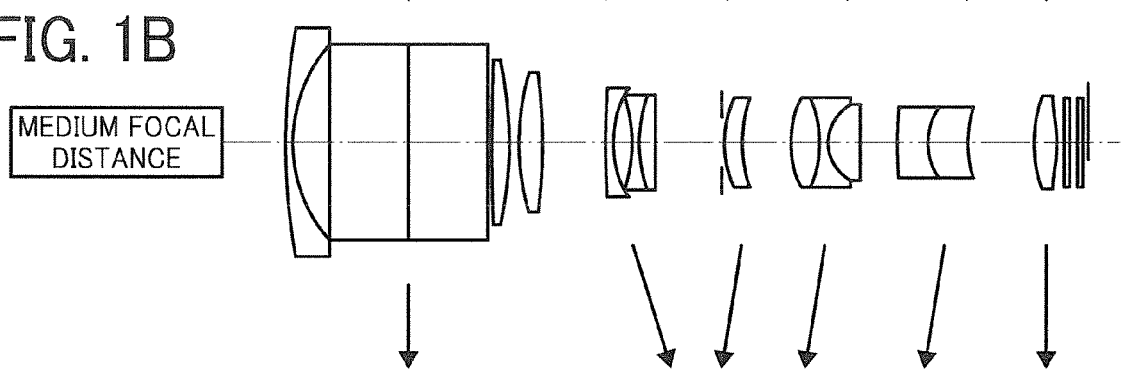
FIG. 1C TELEPHOTO END
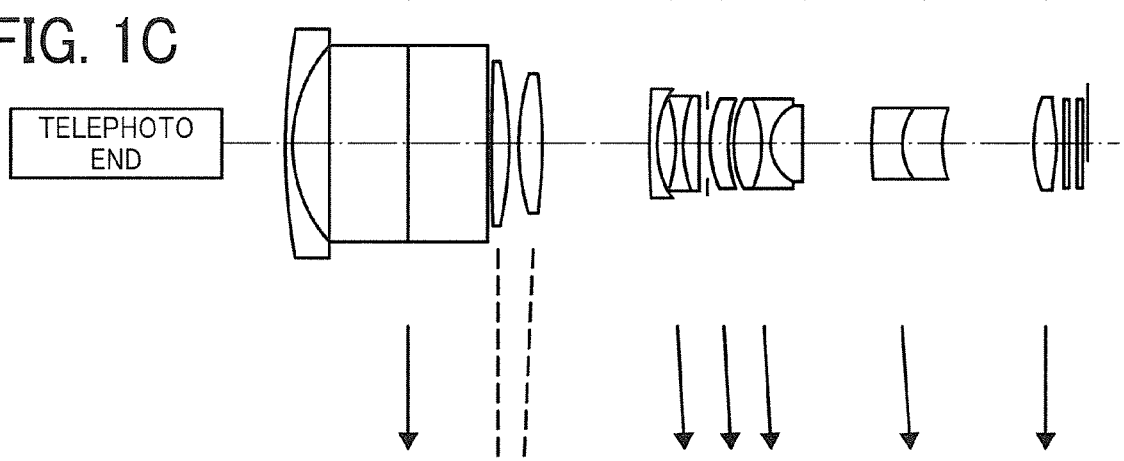
FIG. 1D ONE POINT TELEPHOTO
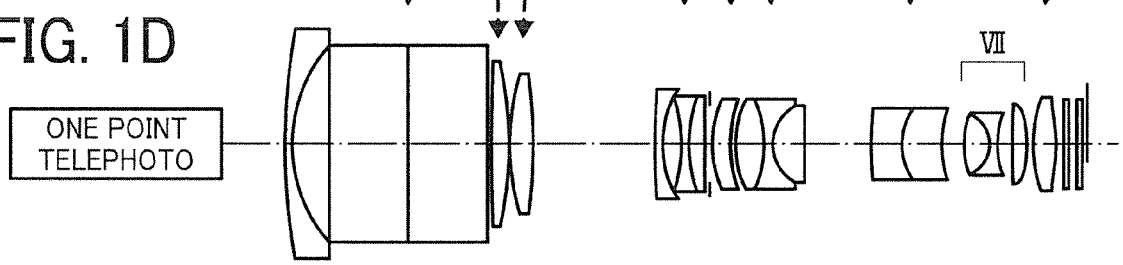

FIG. 6A WIDE ANGLE END
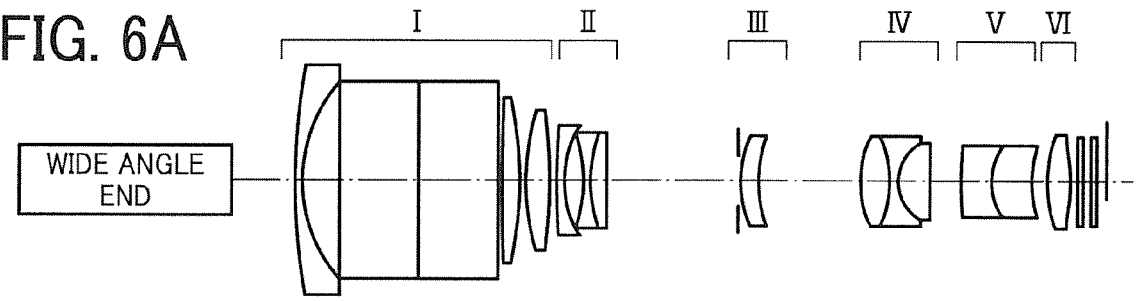
FIG. 6B MEDIUM FOCAL DISTANCE
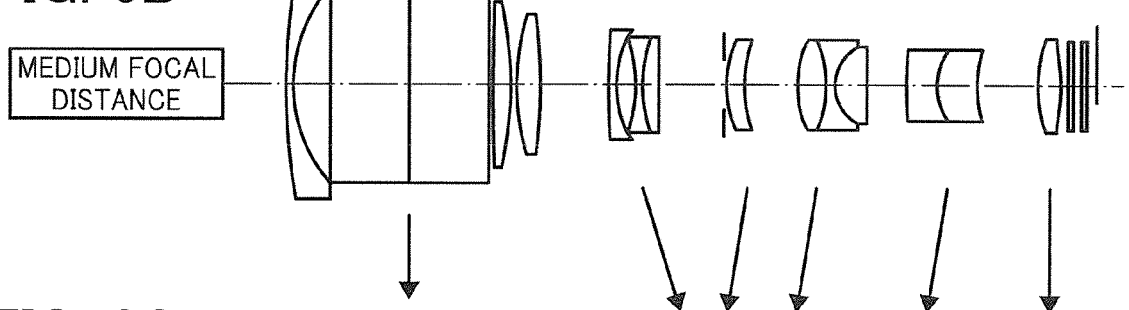
FIG. 6C TELEPHOTO END
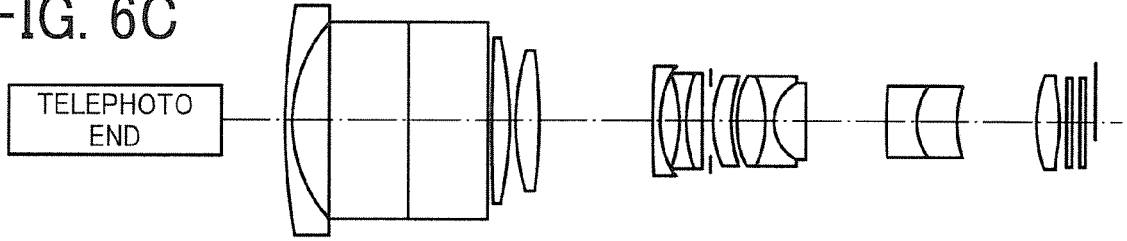
FIG. 6D ONE POINT TELEPHOTO
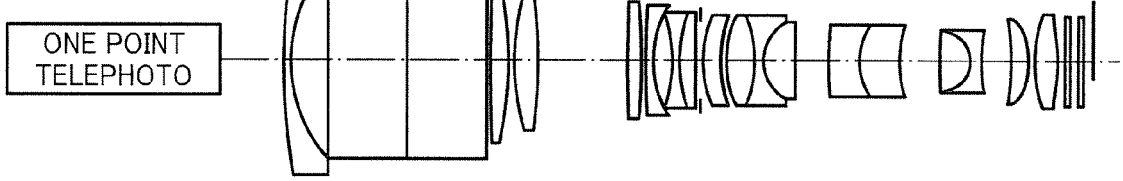

ZOOM LENS AND IMAGING APPARATUS

CROSS REFERENCE TO THE RELATED APPLICATION

The present application is based on and claims priority from Japanese Patent Application Number 2007-239913, filed on Sep. 14, 2007, the disclosure of which is hereby incorporated by reference herein in its entirety.

BACKGROUND OF THE INVENTION

1. Field of the Invention

The present invention relates to a zoom lens and an imaging apparatus. More specifically, the present invention relates to a small zoom lens and a compact imaging apparatus that is employed in such as a video camera or a digital still camera, which treats such as a fixed imaging element as an imaging element thereof.

2. Description of the Related Art

A demand is being made upon a digital camera for both a higher performance and a greater degree of miniaturization thereof. A similar demand is also being made upon a zoom lens that is employed as an imaging lens of the digital camera for both the higher performance and the greater degree of miniaturization thereof. With respect to the miniaturization aspect of the zoom lens, it is necessary to begin by shortening an overall length of the lens, i.e., a maximum distance from a lens surface that faces a photographic subject to an imaging site of the digital camera, when the lens is deployed for photographic use.

Improving the performance of the zoom lens will require that the zoom lens comprise a resolution that supports an imaging element comprising between five and 10 megapixels, at a minimum, across an entire zoom range thereof, if an application thereof to a high-end digital camera is to be contemplated.

A solid demand also exists for an increasingly wide angle and a greater degree of magnification of a photographic lens of the digital camera. A half field angle at a wide-angle end of 38 degrees or more is desirable in this regard. A half field angle of 38 degrees corresponds to a focal length of 28 mm when converted to an application upon a 35 mm silver halide film camera, i.e., a camera of a Leica variety, as an instance thereof. A demand for a magnification of at least 5× is also explicitly required, as always.

A technique is known of effecting a weight reduction in a camera that comprises the zoom lens by refracting an optical path by interposing a prism within an optical assembly of the zoom lens; refer to Japanese Patent Application Publication No. H8-248318 and Japanese Patent Application Publication No. 2000-131610 for particulars.

The zoom lens that is disclosed according to Japanese Patent Application Publication No. H8-248318 and Japanese Patent Application Publication No. 2000-131610 is optimized for use with a video camera. According to a specific embodiment thereof, the zoom lens thus disclosed is a large zoom lens, comprising a magnification of 8× or more, according to Japanese Patent Application Publication No. H8-248318, or a magnification of 11× or more, according to Japanese Patent Application Publication No. 2000-131610. The zoom lens thus disclosed, however, further comprises a half field angle of a wide angle end that is on the order of either 25 degrees, according to Japanese Patent Application Publication No. H8-248318, or 31 degrees, according to Japanese Patent Application Publication No. 2000-131610, and thus, cannot be considered suitable for facilitating the half field angle of 38 degrees or more that is demanded for use with digital cameras. In addition, according to the specific embodiment that is disclosed in Japanese Patent Application Publication No. H8-248318 and Japanese Patent Application Publication No. 2000-131610, a large distortion aberration, on the order of 8%, is present with respect to the wide angle end thereof, which is inadequate as a specification for use as a high performance specification zoom lens.

SUMMARY OF THE INVENTION

An object of the present invention is to provide a zoom lens that is capable of achieving a half field angle of not less than 38 degrees at a wide angle end, a magnification of not less than 5×, and a resolution that supports an imaging element on the order of five to 10 megapixels, and that is thus optimized as a zoom lens for use with a compact, high performance digital camera.

Another object of the present invention is to provide an imaging apparatus that employs such a zoom lens as is described herein.

In order to accomplish the above objects, a zoom lens according to an embodiment of the present invention includes a first lens group that comprises a positive refraction index and is anchored in place when performing a magnification of an image, a second lens group that comprises a negative refraction index, a third lens group that comprises a positive refraction index, a fourth lens group that comprises a positive refraction index, a fifth lens group that comprises a negative refraction index, and a sixth lens group that comprises a positive refraction index, these lens groups being disposed in order along an optical axis from a side nearest to a photographic subject to an imaging site. When magnifying from a wide angle end to a telephoto end, the magnification thereof is performed by moving the second lens group, the fourth lens group, and the fifth lens group, at a minimum, the first lens group whereof comprises a reflective optical element, i.e., a prism, which is for refracting a light path therein, and a magnification to a long focal distance that is even longer than the telephoto end is performed by interposing, at a minimum, an additional lens group that comprises a negative refraction index, as an additional lens group, between the lens groups described herein of the zoom lens.

BRIEF DESCRIPTION OF THE DRAWINGS

FIG. 1A is a schematic view showing a state of a wide angle end of a zoom lens according to a first embodiment of the present invention.

FIG. 1B is a schematic view showing a state of a medium focal length of the zoom lens according to the first embodiment of the present invention.

FIG. 1C is a schematic view showing a state of a telephoto end of the zoom lens according to the first embodiment of the present invention.

FIG. 1D is a schematic view showing a state of a one point telephoto of the zoom lens according to the first embodiment of the present invention.

FIG. 6A is a schematic view showing a state of a wide angle end of a zoom lens according to a second embodiment of the present invention.

FIG. 6B is a schematic view showing a state of the medium focal length of the zoom lens according to the second embodiment of the present invention.

FIG. 6C is a schematic view showing a state of a telephoto end of the zoom lens according to the second embodiment of the present invention.

FIG. 6D is a schematic view showing a state of a one point telephoto of the zoom lens according to the second embodiment of the present invention.

DETAILED DESCRIPTION OF THE PREFERRED EMBODIMENTS

Figure 2:
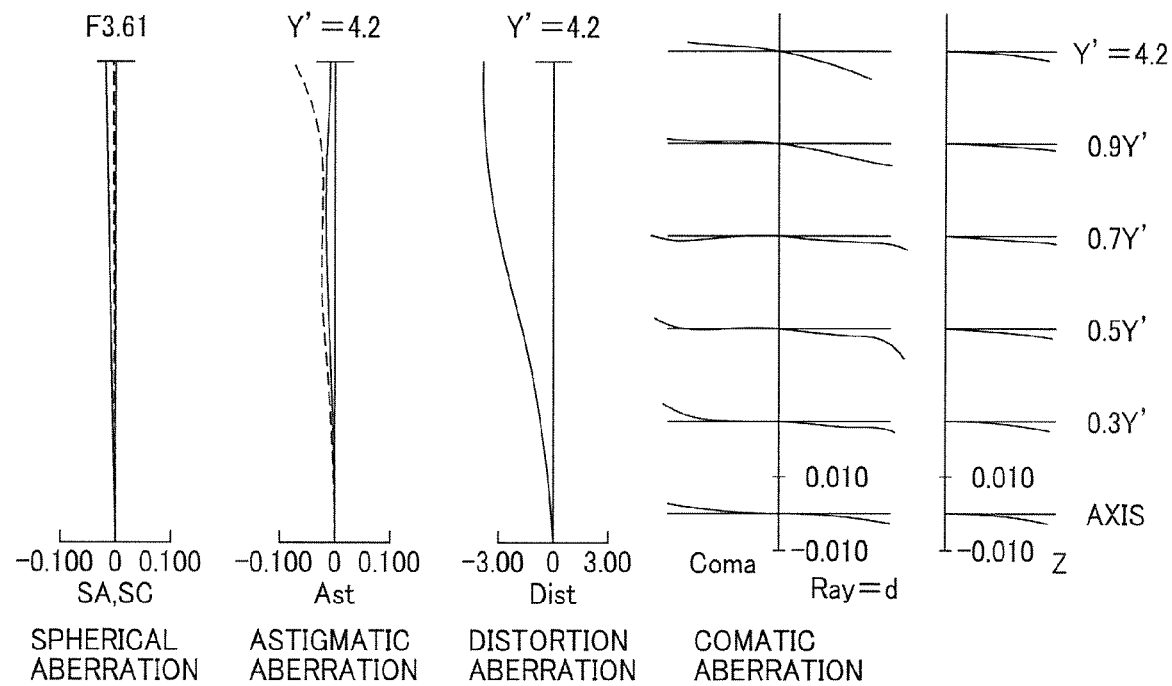
FIG. 2 is a view showing an aberration with respect to the wide angle end of the zoom lens according to the first embodiment.
Figure 3:
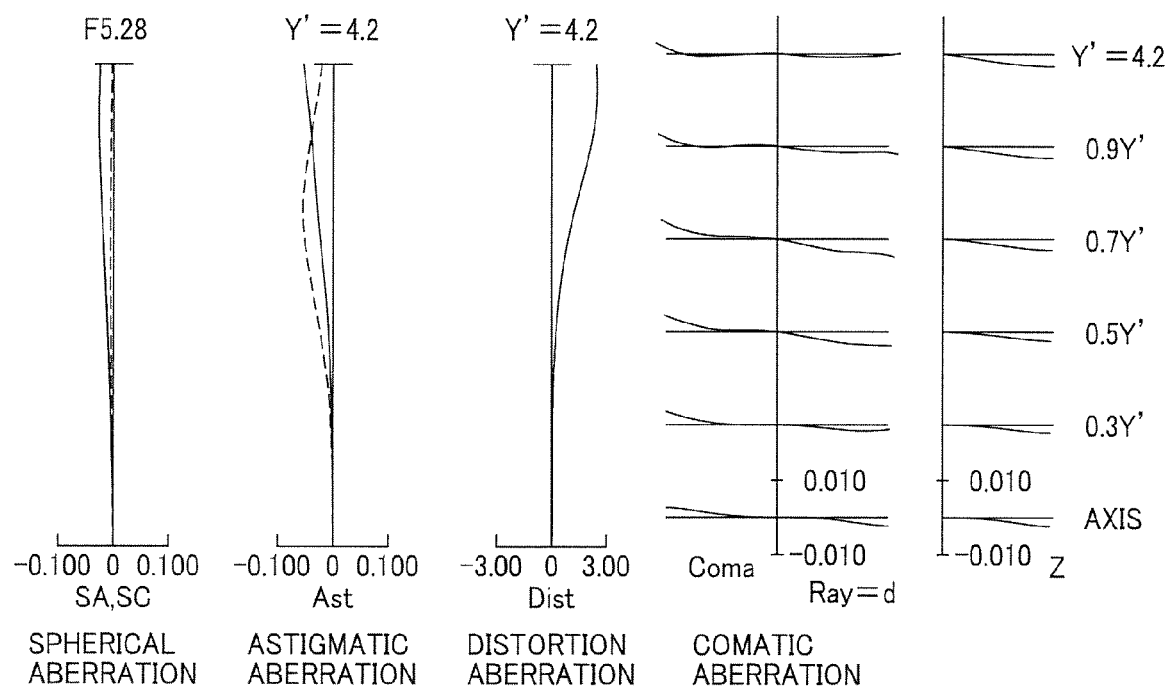
FIG. 3 is a view showing an aberration with respect to the medium focal length of the zoom lens according to the first embodiment.
Figure 4:
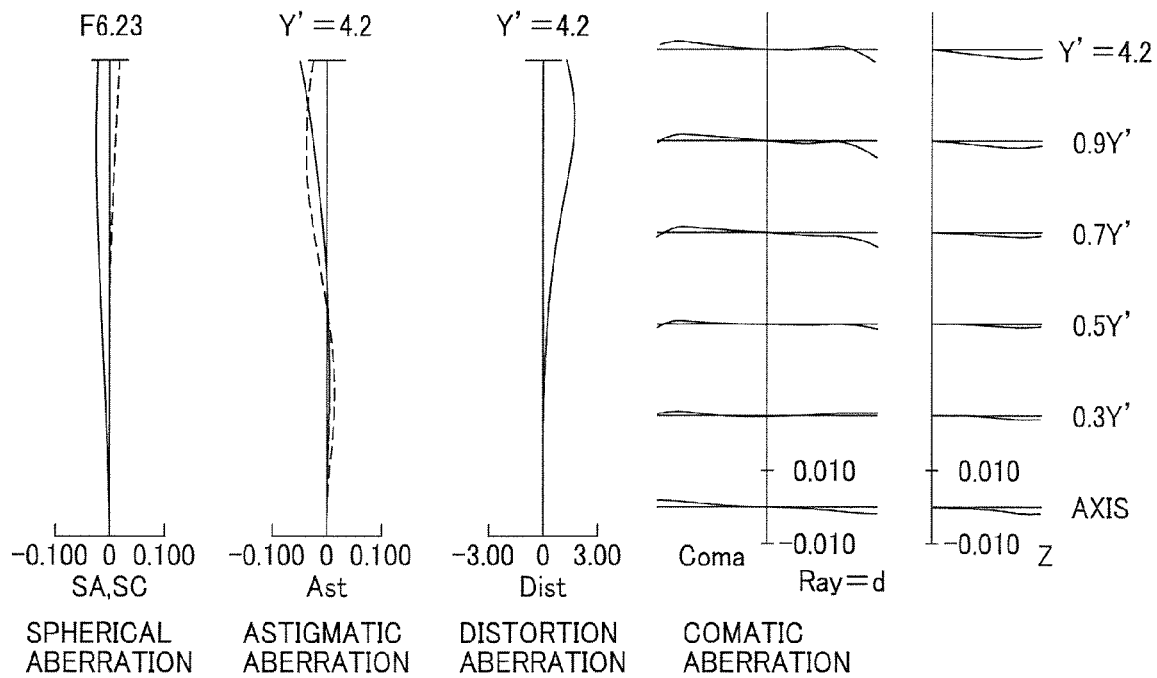
FIG. 4 is a view showing an aberration with respect to the telephoto end of the zoom lens according to the first embodiment.

Following is a detailed description of preferred embodiments of the present invention, with reference to the attached drawings.

FIG. 1A through FIG. 1D illustrate a first embodiment of a zoom lens according to the present invention.

In the zoom lens according to the first embodiment, disposed in order along an optical axis from a side nearest to a photographic subject to an imaging site, i.e., from left in FIG. 1A through FIG. 1D, are a first lens group I that comprises a positive refraction index and is anchored in place when performing a magnification of an image, a second lens group II that comprises a negative refraction index, a third lens group III that comprises a positive refraction index, a fourth lens group IV that comprises a positive refraction index, a fifth lens group V that comprises a negative refraction index, and a sixth lens group VI that comprises a positive refraction index. When magnifying from a wide angle end to a telephoto end, such as is depicted in FIG. 1A, the magnification thereof is performed by moving the second lens group II, the fourth lens group IV, and the fifth lens group V, at a minimum, and the first lens group I comprises a reflective optical element, i.e., a prism, which is for refracting a light path therein. FIG. 1B depicts a state of a medium focal length of the zoom lens thereof.

According to the first embodiment, the first lens group is configured of three lenses and one prism, which are positioned, in order from the side nearest to the photographic subject to the imaging site, as a negative meniscus lens with a convex surface thereof facing toward the photographic subject, the prism, a first biconvex lens, and a second biconvex lens. The prism, which is positioned immediately beside the negative meniscus lens in the direction of the imaging site, is the reflective optical element that is for refracting the light path, and as such, refracts the light path on the side of the negative meniscus lens in the direction of the imaging site by 90 degrees. FIG. 1A through FIG. 1D denote a deployment of the lens array along the optical axis.

According to the first embodiment, when a one point telephoto is implemented, such as is shown in FIG. 1D, an additional lens group VII, comprising a negative refraction index, is interposed between the lens groups of the zoom lens as an additional lens group thereof, and a magnification to a long focal distance that is even longer than the telephoto end is performed thereby, again, such as is depicted in FIG. 1D.

In addition, the first lens group I and the sixth lens group VI that configure the zoom lens are respectively anchored in place, and an overall length of the zoom lens before and after the interposition of the additional lens group VII is unchanging. When the additional lens group VII is interposed therein, the second lens group II, the third lens group III, the fourth lens group IV, and the fifth lens group V move to a location that is optimized thereof for the one point telephoto.

In addition, the additional lens group VII is interposed closer to the imaging site than the fifth lens group V, i.e., between the fifth lens group V and the sixth lens group VI. The additional lens group VII that is thus interposed is a cemented lens that is formed from two lenses. In addition, the biconvex lens that is the closer to the imaging site of the two biconvex lenses of the first lens group that are between the prism thereof and the imaging site moves toward the biconvex lens that is closer to the photographic subject, thereby changing a lens interval thereof.

FIG. 6A through FIG. 6D illustrate a second embodiment of the zoom lens according to the present invention.

In the zoom lens according to the second embodiment, disposed in order along an optical axis from a side nearest to a photographic subject to an imaging site, i.e., from left in FIG. 6A through FIG. 6D, are a first lens group I that comprises a positive refraction index and is fixed in place when performing a magnification of an image, a second lens group II that comprises a negative refraction index, a third lens group III that comprises a positive refraction index, a fourth lens group IV that comprises a positive refraction index, a fifth lens group V that comprises a negative refraction index, and a sixth lens group VI that comprises a positive refraction index. When magnifying from a wide angle end, such as is depicted in FIG. 6A, to a telephoto end, such as is depicted in FIG. 6C, the magnification thereof is performed by moving the second lens group II, the fourth lens group IV, and the fifth lens group V, at a minimum, and the first lens group I comprises a reflective optical element, i.e., a prism, which is for refracting a light path therein. FIG. 6B illustrates a state of a medium focal length of the zoom lens thereof.

As per the first embodiment, according to the second embodiment, the first lens group is configured of three lenses and one prism, which are positioned, in order from the side nearest to the photographic subject to the imaging site, as a negative meniscus lens with a convex surface thereof facing toward the photographic subject, the prism, a first biconvex lens, and a second biconvex lens. The prism, which is positioned immediately beside the negative meniscus lens in the direction of the imaging site, is the reflective optical element that is for refracting the light path, and as such, refracts the light path on the side of the negative meniscus lens in the direction of the imaging site by 90 degrees. In a manner similar to FIG. 1A through FIG. 1D, FIG. 6A through FIG. 6D illustrate a deployment of the lens array along the optical axis.

According to the second embodiment, as depicted in FIG. 6A through 6D, when a one point telephoto is implemented, an additional lens group VII, comprising a positive refraction index, and an additional lens group VIII, comprising a negative refraction index, is interposed between the lens groups of the zoom lens as an additional lens group thereof, and a magnification to a long focal distance that is even longer than the telephoto end is performed thereby, again, such as is depicted in FIG. 6D.

In addition, the first lens group I and the sixth lens group VI that configure the zoom lens are respectively anchored in place, and an overall length of the zoom lens before and after the interposition of the additional lens group VII and VIII is unchanging.

When the additional lens group VII and VIII is interposed between the lens groups of the zoom lens, the second lens group II, the third lens group III, the fourth lens group IV, and the fifth lens group V are moved. In addition, the additional lens group VII is comprised of a plurality of lenses, i.e., a cemented lens that is formed from two lenses and three positive meniscus lenses, the additional lens group VII is interposed between the first lens group I and the second lens group II, and the additional lens group VIII is interposed closer than the fifth image group V to the imaging site, i.e., between the fifth lens group V and the sixth lens group VI.

The zoom lens that is described according to the first embodiment and the second embodiment respectively satisfies both a condition (1) and a condition (2).

Figure 11A:
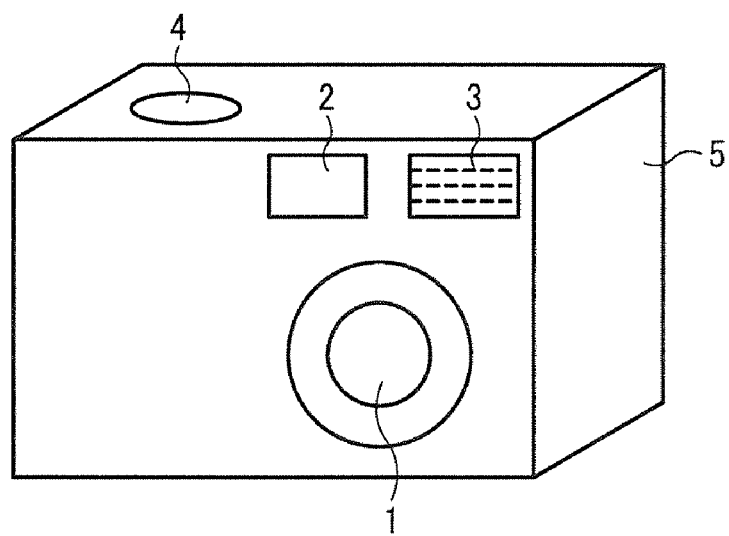
FIG. 11A is an oblique view depicting a front surface of an embodiment of an imaging apparatus according to the present invention.
Figure 11B:
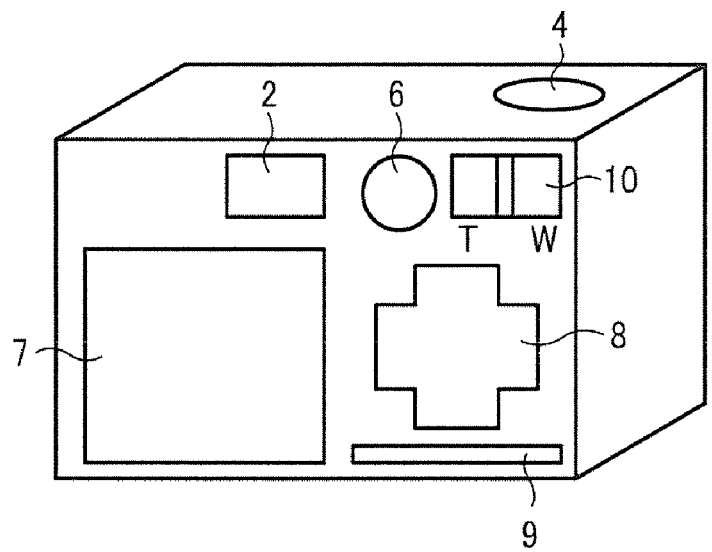
FIG. 11B is an oblique view depicting a rear surface of the embodiment of the imaging apparatus according to the present invention.

FIG. 11A and FIG. 11B illustrate an embodiment of an imaging apparatus, i.e., a digital camera, according to the present invention, which applies the zoom lens described herein.

FIG. 11A depicts a front surface and an upper surface of the imaging apparatus, and FIG. 11B depicts a rear surface of the imaging apparatus. The imaging apparatus comprises the zoom lens according to the first embodiment and the second embodiment as described herein as a photographic lens 1, i.e., a zoom lens for taking a photograph, thereof.

Reference numeral 2 is a viewfinder, reference numeral 3 is a flash lamp, reference numeral 4 is a shutter button, reference numeral 5 is a casing of the imaging apparatus, reference numeral 6 is a power switch, reference numeral 7 is an LCD monitor, reference numeral 8 is a console switch, reference numeral 9 is a card slot, and reference numeral 10 is a zoom control unit.

Figure 12:
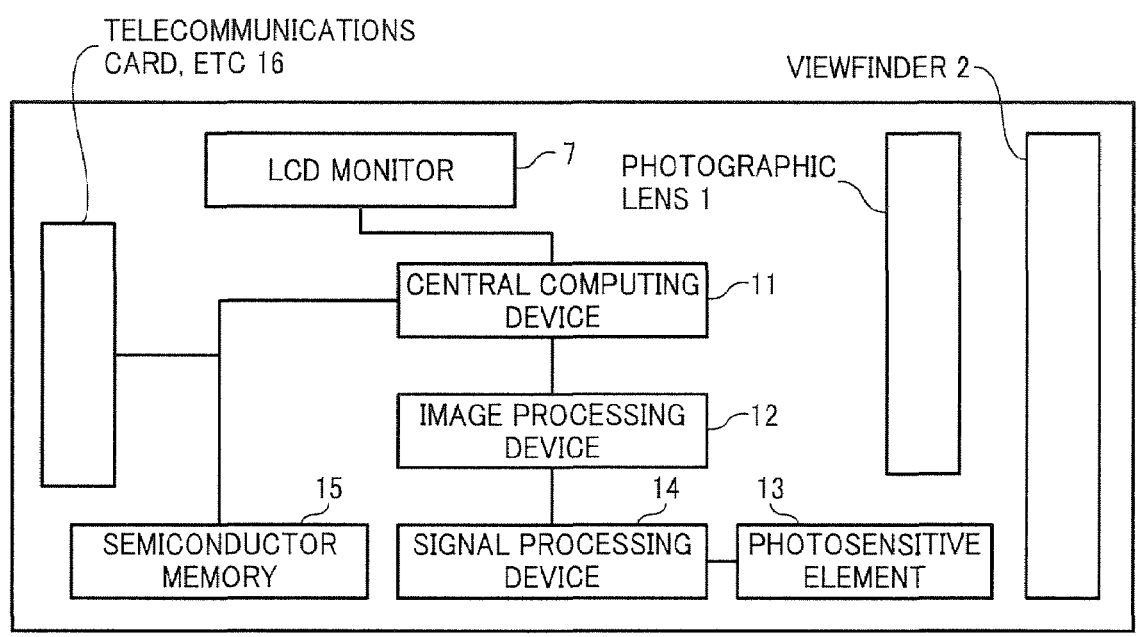
FIG. 12 is a system configuration diagram of the imaging apparatus.

FIG. 12 illustrates A system configuration of the imaging apparatus that is shown in FIG. 12.

As shown in FIG. 12, the imaging apparatus comprises the photographic lens 1 and a photosensitive element 13, which is configured such that a photographic image of a photographic subject that is formed by the photographic lens 1 is obtained by the photosensitive element 13, and an output of the photosensitive element 13 is processed and converted into a digital information by a signal processing device 14, upon receipt thereby of a control from a central computing device 11. Put another way, a camera device comprises a function that treats a photographic image as digital information. In addition, it is possible for the camera device to engage in a data exchange with a device that is external thereto by way of such as a telecommunication card or similar device 16. Accordingly, the imaging apparatus comprises a specification as a portable information terminal device.

Implementations:

Following is a description of two implementations of a concrete lens data of the zoom lens.

FIG. 1A through FIG. 1D illustrate a lens configuration of the zoom lens according to the first embodiment, and a zoom trajectory when zooming the zoom lens according to the first embodiment from a wide angle end through a specified medium focal length to both a telephoto end and a one point telephoto. The zoom lens according to the first embodiment comprises a prism, which is within a first lens group I, as a reflective optical element that refracts a light path therein.

In the zoom lens according to the first embodiment, disposed in order from a photographic subject, i.e., from left in FIG. 1A through FIG. 1D, and traversing an optical axis, are a first lens group I that comprises a positive refraction index, a second lens group II that comprises a negative refraction index, a third lens group III that comprises a positive refraction index, a fourth lens group IV that comprises a positive refraction index, a fifth lens group V that comprises a negative refraction index, and a sixth lens group VI that comprises a positive refraction index. The zoom lens according to the first embodiment further comprises an aperture stop between the second lens group II and the third lens group III.

When magnifying from the wide angle end to the telephoto end, an interval between the first lens group I and the second lens group II increases, an interval between the second lens group II and the third lens group III decreases, an interval between the third lens group III and the fourth lens group IV decreases, an interval between the fourth lens group TV and the fifth lens group V increases, and an interval between the fifth lens group V and the sixth lens group VI increases.

A configuration that applies when switching from the telephoto end to the one point telephoto involves interposing an additional lens group VII, which comprises a negative refraction power, between the fifth lens group V and the sixth lens group VI, and changing an interval between two positive lenses of the first lens group I that are closer to the imaging site of the imaging apparatus than the prism of the first lens group I.

It is possible to extend an overall focal length of the zoom lens assembly by interposing the additional lens group VII, which comprises the negative refraction power, as described herein. In addition, a configuration of the additional lens group VII is configured from a cemented lens, which comprises a positive refraction index lens and a negative refraction index lens, and a positive lens. The configuration thereof corrects all aberrations thereby, and corrects a spherical aberration with respect to the one point telephoto by changing an interval between the two positive lenses of the first lens group I that are closer to the imaging site of the imaging apparatus than the prism of the first lens group I.

A configuration such as the configuration described herein allows extending the focal length from a 34.99 focal length of the telephoto end to a 52.47 focal length of the one point telephoto, or approximately 1.5×, without out changing the overall length of the lens. Put another way, it is possible thereby to achieve a one point telephoto focal length on the order of 300 mm, when converted to a 35 mm silver halide film camera focal length, in addition to a zoom lens with a focal length between 28 mm and 200 mm therewith, without changing the overall length of the lens.

Following is a description of the data of the zoom lens according to the first implementation thereof:

"f" in the data refers to the focal length of the overall zoom lens assembly, "FNO." refers to the F number, and "ω" refers to the half angle width in degrees, respectively.

In the lens data, a surface number refers to a number of a sequence of a surface, i.e., a lens surface and an aperture stop surface, in order starting from a surface nearest to the photographic subject, and a surface interval refers to an interval between a given surface and a neighboring surface thereof, respectively. "Nd" refers to a refraction index of a medium quality with respective to a "d-line" where λ=587.6 nm, and v refers to an Abbe's number, respectively. An atmospheric refraction index of 1.00000 is omitted. An aspheric surface that is employed as appropriate to the lens surface is described by the following established equation:

$$X = CH^2/\{1+\sqrt{(1-(1+K)C^2H^2}\} \ldots + A4 \cdot H^4 + A6 \cdot H^6 + A8 \cdot H^8 + A10 \cdot H^{10} + A12 \cdot H^{12} \ldots + A14 \cdot H^{14} + A16 \cdot H^{16} + A18 \cdot H^{18} \ldots$$

wherein a reciprocal of a radius of paraxial curvature, i.e., a paraxial curvature, is denoted by "C," a height from the optical axis is denoted by "H," a depth of an optical axis direction is denoted by "X," "K" denotes a conical constant, and "A4," "A6," etc., denote an aspheric coefficient. The symbols and what the symbols represent holds true as well with respect to the second implementation (to be described hereinafter). While the focal length, the radius of curvature, the surface interval, and other lengths are measured as a rule in millimeters herein, a comparable optical performance may be obtained even if the optical assembly is proportionally enlarged or reduced. Accordingly, the unit of measurement herein is not restricted to millimeters.

Lens Data with Respect to First Implementation:

f = 5.20 to 34.99, 52.47; FNO. = 3.61 to 6.23, 6.65;
ω = 38.9 to 6.84, 4.58

| Surface Number | Radius of Curvature | Surface Interval | Nd | vd |
|---|---|---|---|---|
| 1 | 50.96380 | 0.71667 | 1.92286 | 18.90 |
| 2 | 14.01786 | 3.60308 | | |
| 3 | ∞ | 7.99013 | 1.92286 | 18.90 |
| 4 | ∞ | 7.99013 | 1.92286 | 18.90 |
| 5 | ∞ | 0.20000 | | |
| 6 | 506.14706 | 1.84502 | 1.80400 | 46.57 |
| 7 | −36.37371 | Variable (A) | | |
| 8 | 23.74010 | 2.40823 | 1.65160 | 58.55 |
| 9 | −50.99979 | Variable (B) | | |
| 10 | 75.85056 | 0.80000 | 1.88300 | 40.76 |
| 11 | 9.56716 | 1.68916 | | |
| 12 | −15.80507 | 0.80000 | 1.83400 | 37.16 |
| 13 | 12.73295 | 1.75205 | 1.92286 | 18.90 |
| 14 | −153.37224 | Variable (C) | | |
| 15 | ∞ (Aperture Stop) | 0.30000 | | |
| 16 | 9.70050 | 1.72134 | 1.92286 | 18.90 |
| 17 | 12.10370 | Variable (D) | | |
| 18 | 8.63476 | 2.93718 | 1.80400 | 46.57 |
| 19 | −10.73892 | 0.80725 | 1.74950 | 35.33 |
| 20 | 4.25168 | 3.20195 | 1.62041 | 60.29 |
| 21 | −107.44296 | Variable (E) | | |
| 22 | 56.51777 | 3.00000 | 2.00069 | 25.46 |
| 23 | 5.92400 | 4.00000 | 1.80610 | 33.27 |
| 24 | 12.17259 | Variable (F) | | |
| 25 | 0.00000 | 0.00000 | (Virtual Surface 1) | |
| 26 | 0.00000 | 0.00000 | (Virtual Surface 2) | |
| 27 | 0.00000 | 0.00000 | (Virtual Surface 3) | |
| 28 | 0.00000 | 0.00000 | (Virtual Surface 4) | |
| 29 | 0.00000 | Variable (G) | (Virtual Surface 5) | |
| 30 | 19.17642 | 2.28090 | 1.48749 | 70.24 |
| 31 | −16.15517 | 0.70000 | | |
| 32 | ∞ | 0.50000 | 1.51633 | 64.10 |
| 33 | ∞ | 0.90000 | | |
| 34 | ∞ | 0.50000 | 1.51633 | 64.10 |
| 35 | ∞ | | | |

The lens data described herein discloses the change from the wide angle end to the telephoto end of the zoom lens as a virtual surface from a 25th surface to a 29th surface. A lens data with respect to the one point telephoto with the additional lens group applied thereto is depicted as follows:

Data on One Point Telephoto from the 25th Surface to the 29th Surface.

| Surface Number | Radius of Curvature | Surface Interval | Nd | vd |
|---|---|---|---|---|
| 25 | 22.27963 | 2.46605 | 1.64769 | 33.79 |
| 26 | −2.94702 | 0.80000 | 1.83400 | 37.34 |
| 27 | 10.51320 | 1.46069 | | |
| 28 | 307.91786 | 1.35674 | 1.48749 | 70.24 |
| 29 | −51.60947 | Variable (G) | | |

Aspheric Data

The 16th lens surface, the 21st lens surface, the 22nd lens surface, the 24th lens surface, the 30th lens surface, and the 31st lens surface are aspheric. In addition, when using the one point telephoto, the 25th lens surface, the 27th lens surface, and the 29th lens surface are aspheric. A respective aspheric surface coefficient thereof is described as follows:

The 16th Surface:

K=0, A4=−8.36122E-05, A6=1.58267E-07, A8=−2.33367E-08, A10=2.47652E-11

The 21st Surface:

K=0, A4=4.84104E-04, A6=9.18463E-06, A8=−2.84614E-07, A10=6.46683E-09

The 22nd Surface:

K=0, A4=−8.40423E-06, A6=8.52755E-06, A8=−3.70415E-07, A10=1.96701E-08

The 24th Surface:

K=0, A4=2.81483E-05, A6=3.61810E-05, A8=−1.94613E-06, A10=6.23743E-08

The 30th Surface:

K=0, A4=−1.07520E-03, A6=1.31137E-04, A8=−3.34410E-06, A10=4.16836E-08

The 31st Surface:

K=0, A4=−1.63368E-03, A6=1.72076E-04, A8=−3.91480E-06, A10=3.06298E 08

Data When Applying One Point Telephoto:

The 25th Surface:

K=0, A4=0.9419E-03, A6=0.3391E-03, A8=−0.7302E-04, A10=0.7678E-05

The 27th Surface:

K=0, A4=0.2525E-02, A6=−0.9862E-05

The 29th Surface:

K=0, A4=−0.4162E-02, A6=0.1368E-03, A8=−0.8578E-05

Variable Quantities:

|   | Wide Angle End | Medium Focal Length | Telephoto End | One Point Telephoto |
|---|---|---|---|---|
| A | 0.95238 | 0.95238 | 0.95238 | 0.10000 |
| B | 0.70000 | 6.44851 | 10.84886 | 12.40133 |
| C | 13.01640 | 6.45435 | 0.73022 | 0.40000 |
| D | 9.61168 | 4.84544 | 0.40150 | 0.40000 |
| E | 3.03498 | 3.78691 | 7.09764 | 6.89070 |
| F | 1.53995 | 6.36781 | 8.82480 | 2.13877 |
| G | 0.00000 | 0.00000 | 0.00000 | 0.44109 |

Figure 5:
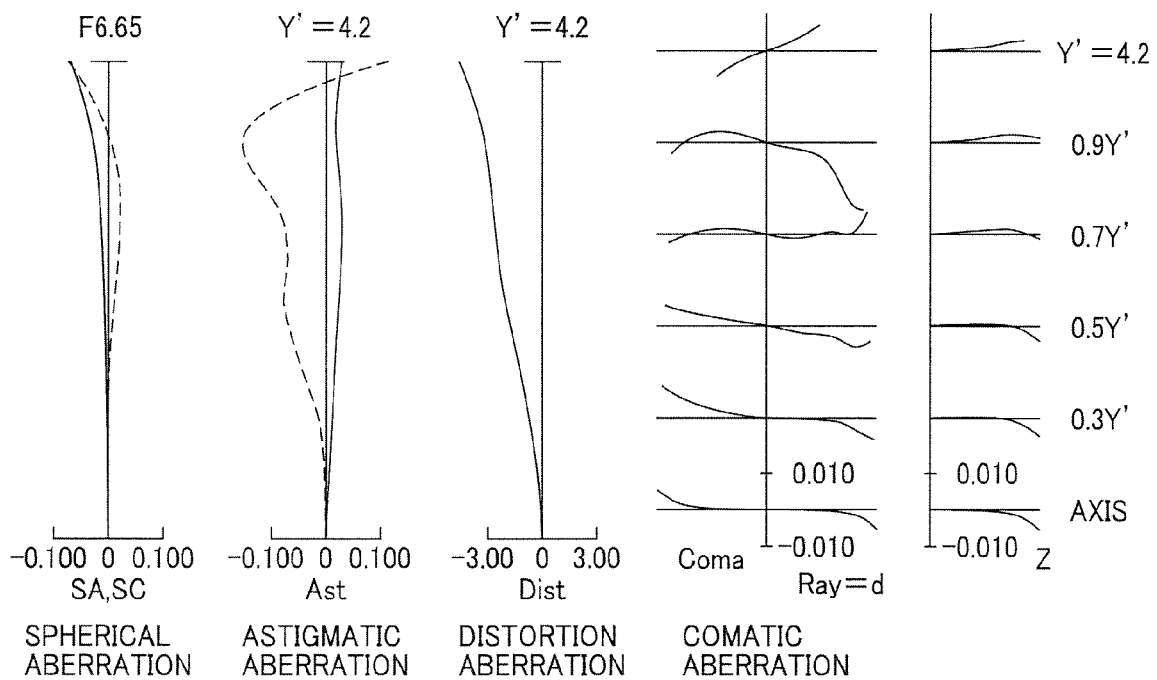
FIG. 5 is a view showing an aberration with respect to the one point telephoto of the zoom lens according to the first embodiment.

FIG. 2, FIG. 3, FIG. 4, and FIG. 5 respectively illustrate each aberration of a wide angle end of the zoom lens according to the first embodiment (FIG. 2), a specified medium focal length of the zoom lens according to the first embodiment (FIG. 3), a telephoto end of the zoom lens according to the first embodiment (FIG. 4), and a one point telephoto of the zoom lens according to the first embodiment (FIG. 5). Disposed in order from left, the aberrations thus depicted are: a spherical aberration (leftmost), an astigmatic aberration (second from left), a distortion aberration (second from right), and a comatic aberration (rightmost). A solid line within each respective drawing with respect to the astigmatic aberration denotes a sagittal image surface, and a dashed line therewithin denotes a meridional image surface. The comatic aberration diagram denotes the comatic aberration with regard to each respective image height. It is to be understood that a "d" in the respective aberration diagrams denotes the aberration with respect to the "d-line," wherein λ=587.6 nm. A range of an x-axis with respect to the spherical aberration diagram is ±0.1, a range of an x-axis with respect to the astigmatic aberration diagram is ±0.1, and a range of an x-axis with respect to the distortion aberration diagram is ±3.0.

FIG. 6A through FIG. 6D illustrate a lens configuration of the zoom lens according to the second embodiment, and a zoom trajectory when zooming the zoom lens according to the second embodiment from a wide angle end through a specified medium focal length to both a telephoto end and a one point telephoto.

In the zoom lens according to the second embodiment, disposed in order from a photographic subject, i.e., from left in FIG. 6A through FIG. 6D, and traversing an optical axis, are a first lens group I that comprises a positive refraction index, a second lens group II that comprises a negative refraction index, a third lens group III that comprises a positive refraction index, a fourth lens group IV that comprises a positive refraction index, a fifth lens group V that comprises a negative refraction index, and a sixth lens group VI that comprises a positive refraction index. The zoom lens according to the first embodiment further comprises an aperture stop between the second lens group II and the third lens group III.

When magnifying from the wide angle end to the telephoto end, an interval between the first lens group I and the second lens group It increases, an interval between the second lens group II and the third lens group III decreases, an interval between the third lens group III and the fourth lens group IV decreases, an interval between the fourth lens group IV and the fifth lens group V increases, and an interval between the fifth lens group V and the sixth lens group VI increases.

A configuration that applies when switching from the telephoto end to the one point telephoto involves interposing an additional lens group VII between the first lens group I and the second lens group II, and an additional lens group VIII between the fifth lens group V and the sixth lens group VI. It is to be understood that the additional lens group VIII according to the second embodiment is a different lens group from the additional lens group VII according to the first embodiment.

It is possible to correct the spherical aberration that arises primarily with respect to the one point telephoto by interposing the additional lens group VII, and to extend an overall focal length of the zoom lens assembly by interposing the additional lens group VIII.

The additional lens group VII is configured from a single positive refraction index lens, whereas a configuration of the additional lens group VIII is configured from a cemented lens, which comprises a positive refraction index lens and a negative refraction index lens, and a positive lens, which corrects all aberrations thereby.

The configuration thereof corrects all aberrations thereby, and corrects a spherical aberration with respect to the one point telephoto by changing an interval between the two positive lenses of the first lens group I that are closer to the imaging site of the imaging apparatus than the prism of the first lens group I.

A configuration such as the configuration described herein allows extending the focal length from a 34.99 focal length of the telephoto end to a 52.48 focal length of the one point telephoto, or approximately 1.5×, without out changing the overall length of the lens. Put another way, it is possible thereby to achieve a one point telephoto focal length on the order of 300 mm, when converted to a 35 mm silver halide film camera, in addition to a zoom lens with a focal length between 28 mm and 200 mm therewith, without changing the overall length of the lens.

Following is a description of a data of the zoom lens according to the second implementation. Note that the data described herein follows the format of the data described according to the first implementation thereof:

Lens Data According to the Second Implementation:

f = 5.20 to 34.99, 52.48; FNO. = 3.59 to 6.14, 6.77; ω = 38.9 to 6.84, 4.58

| Surface Number | Radius of Curvature | Surface Interval | Nd | vd |
|---|---|---|---|---|
| 1 | 39.70354 | 0.70000 | 1.92286 | 18.90 |
| 2 | 13.33893 | 3.88665 | | |
| 3 | ∞ | 7.99774 | 1.92286 | 18.90 |
| 4 | ∞ | 7.99774 | 1.92286 | 18.90 |
| 5 | ∞ | 0.20000 | | |
| 6 | 606.38385 | 1.76133 | 1.80400 | 46.57 |
| 7 | −39.06112 | 0.50000 | | |
| 8 | 25.25881 | 2.47368 | 1.65160 | 58.55 |
| 9G | −42.67960 | Variable (A) | | |
| 10 | 0.00000 | 0.00000 | (Virtual Surface 1) | |
| 11 | 0.00000 | 0.00000 | (Virtual Surface 2) | |
| 12 | 107.38740 | 0.80000 | 1.88300 | 40.76 |
| 13 | 9.88545 | 1.64791 | | |
| 14 | −17.22580 | 0.80000 | 1.83400 | 37.16 |
| 15 | 12.59665 | 1.74235 | 1.92286 | 18.90 |
| 16 | −342.48143 | Variable (B) | | |
| 17 | ∞ (Aperture Stop) | 0.30000 | | |
| 18 | 9.56174 | 1.64732 | 1.92286 | 18.90 |
| 19 | 11.82136 | Variable (C) | | |
| 20 | 8.75392 | 3.12455 | 1.80400 | 46.57 |
| 21 | −10.83226 | 0.80000 | 1.74950 | 35.33 |
| 22 | 4.28368 | 3.41849 | 1.62041 | 60.29 |
| 23 | −1051.30851 | Variable (D) | | |
| 24 | 29.72776 | 2.99218 | 2.00069 | 25.46 |
| 25 | 5.42498 | 3.93887 | 1.80610 | 33.27 |
| 26 | 10.35636 | Variable (E) | | |
| 27 | 0.00000 | 0.00000 | (Virtual Surface 3) | |

-continued f = 5.20 to 34.99, 52.48; FNO. = 3.59 to 6.14, 6.77;
ω = 38.9 to 6.84, 4.58

| Surface Number | Radius of Curvature | Surface Interval | Nd | vd |
|---|---|---|---|---|
| 28 | 0.00000 | 0.00000 | (Virtual Surface 4) | |
| 29 | 0.00000 | 0.00000 | (Virtual Surface 5) | |
| 30 | 0.00000 | 0.00000 | (Virtual Surface 6) | |
| 31 | 0.00000 | Variable (F) | (Virtual Surface 7) | |
| 32 | 14.33925 | 2.51470 | 1.48749 | 70.24 |
| 33 | −24.82877 | 0.70000 | | |
| 34 | ∞ | 0.50000 | 1.51633 | 64.10 |
| 35 | ∞ | 0.90000 | | |
| 36 | ∞ | 0.50000 | 1.51633 | 64.10 |
| 37 | ∞ | | | |

The lens data described herein discloses the change from the wide angle end to the telephoto end of the zoom lens as a virtual surface from a 10th surface to an 11th surface, and from a 27th surface to a 31st surface. A lens data with respect to the one point telephoto with the additional lens group applied thereto is depicted as follows:

Data on One Point Telephoto from the 10th Surface to the 11th Surface, and from the 27th Surface to the 31st Surface.

| Surface Number | Radius of Curvature | Surface Interval | Nd | vd |
|---|---|---|---|---|
| 10 | 74.33847 | 1.23622 | 1.62041 | 60.34 |
| 11 | −71.23625 | 0.31213 | | |
| 27 | −19.20091 | 2.84668 | 1.64769 | 33.79 |
| 28 | −3.03030 | 1.62448 | 1.83400 | 37.34 |
| 29 | 48.53757 | 2.35248 | | |
| 30 | −19.08416 | 1.90432 | 1.48749 | 70.24 |
| 31 | −9.82515 | Variable (F) | | |

Aspheric Data

The second lens surface, the 18th lens surface, the 23rd lens surface, the 24th lens surface, the 26th lens surface, the 32nd lens surface, and the 33rd lens surface are aspheric. In addition, when using the one point telephoto, the 10th lens surface, the 27th lens surface, the 29th lens surface, and the 31st lens surface are aspheric. A respective aspheric surface coefficient thereof is described as follows:

The Second Surface:

$K=0.000000, A4=1.802100E-06, A6=5.619600 E09, A8=-1.046170E-09, A10=7.795100E-12$

The 18th Surface:

$K=0.000000, A4=-8.290460E-05, A6=-1.568280E-07, A8=-2.246660E-08, A10=2.517810R-10$

The 23rd Surface:

$K=0.000000, A4=4.840320E-04, A6=9.223690E-06, A8=-5.034800E-07, A10=2.280490E-08$

The 24th Surface:

$K=0.000000, A4=-9.125640E-06, A6=5.566030E-06, A8=-5.556670E-07, A10=3.654440E-08$

The 26th Surface:

$K=0.000000, A4=-5.951380E-05, A6=3.752880E-05, A8=-3.533000E-06, A10=1.427680E-07$

The 32nd Surface:

$K=0.000000, A4=-9.378340E-04, A6=1.201760E-04, A8=-3.262330E-06, A10=3.786300E-08$

The 33rd Surface:

$K=0.000000, A4=-1.956620E-03, A6=1.758730E-04, A8=-4.120130E-06, A10=2.788000E-08$

Data When Applying One Point Telephoto:

The 10th Surface:

$K=0.000000, A4=-0.2490E-04, A6=-0.3684E-06, A8=0.1881E-07, A10=-0.5872E-09$

The 27th Surface:

$K=0.000000, A4=0.1380E-02, A6=0.2488E-03, A8=-0.4775E-04, A10=0.4265E-05$

The 29th Surface:

$K=0.000000, A4=0.2608E-02, A6=-0.5384E-04$

The 31st Surface:

$K=0.000000, A4=-0.2593E-02, A6=0.9760E-04, A8=-0.3286E-05$

Variable Quantities:

| | Wide Angle End | Medium Focal Length | Telephoto End | One Point Telephoto |
|---|---|---|---|---|
| A | 0.70000 | 6.72886 | 11.10512 | 9.06543 |
| B | 13.12673 | 6.61349 | 0.95881 | 0.40000 |
| C | 10.08675 | 5.12099 | 0.40000 | 0.40000 |
| D | 2.82133 | 3.90185 | 7.94032 | 3.20965 |
| E | 0.00000 | 0.00000 | 0.00000 | 4.33402 |
| F | 1.25060 | 5.62022 | 7.58115 | 0.30000 |

Figure 7:
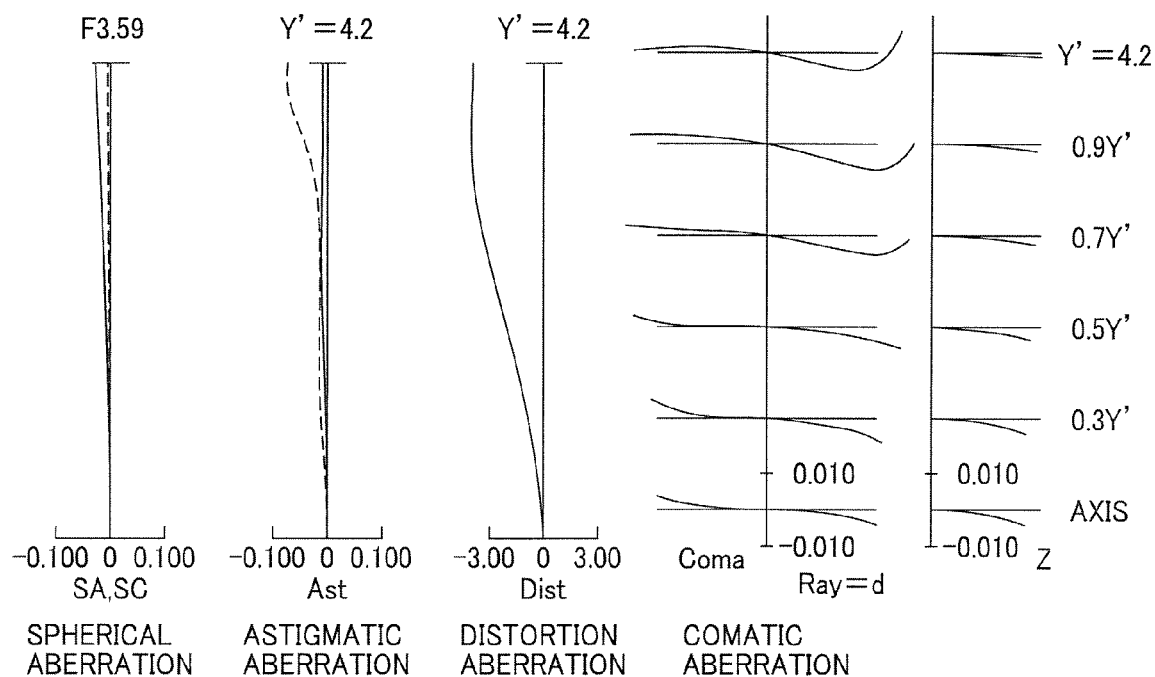
FIG. 7 is a view showing an aberration with respect to the wide angle end of the zoom lens according to the second embodiment.
Figure 8:
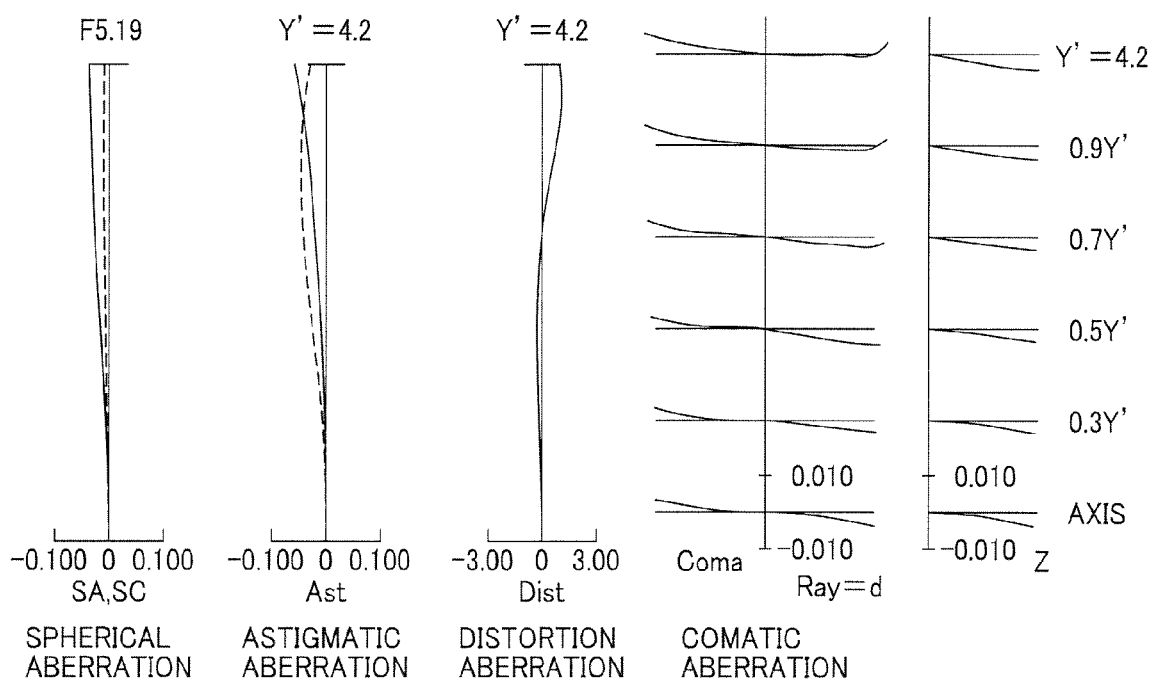
FIG. 8 is a view showing an aberration with respect to the medium focal length of the zoom lens according to the second embodiment.
Figure 9:
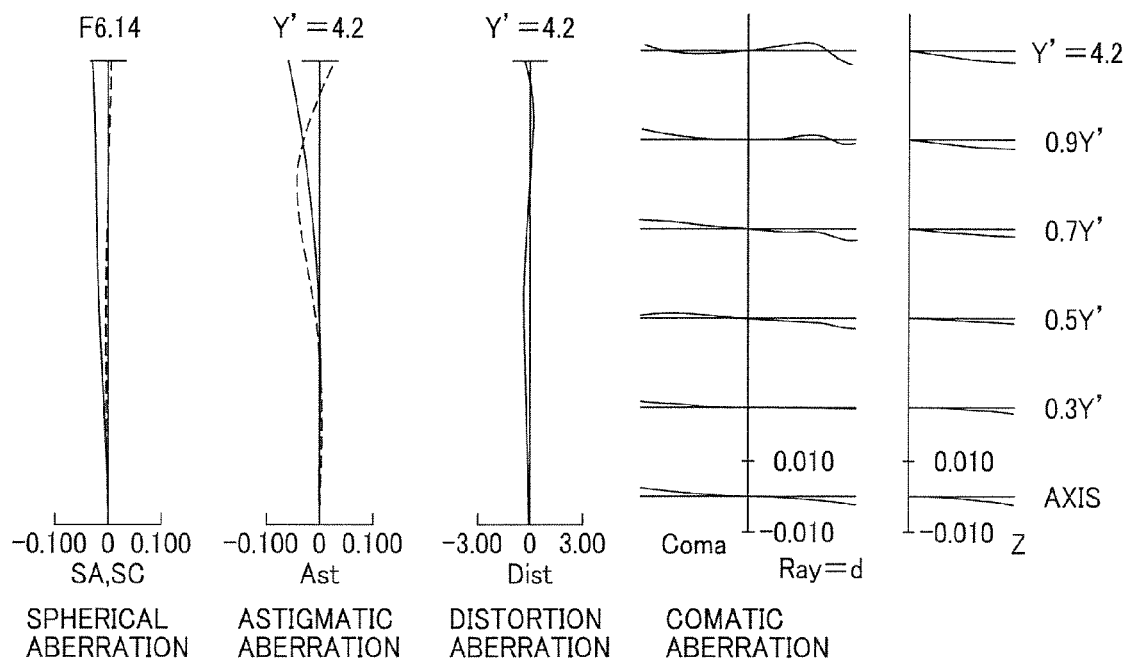
FIG. 9 is a view showing an aberration with respect to the telephoto end of the zoom lens according to the second embodiment.
Figure 10:
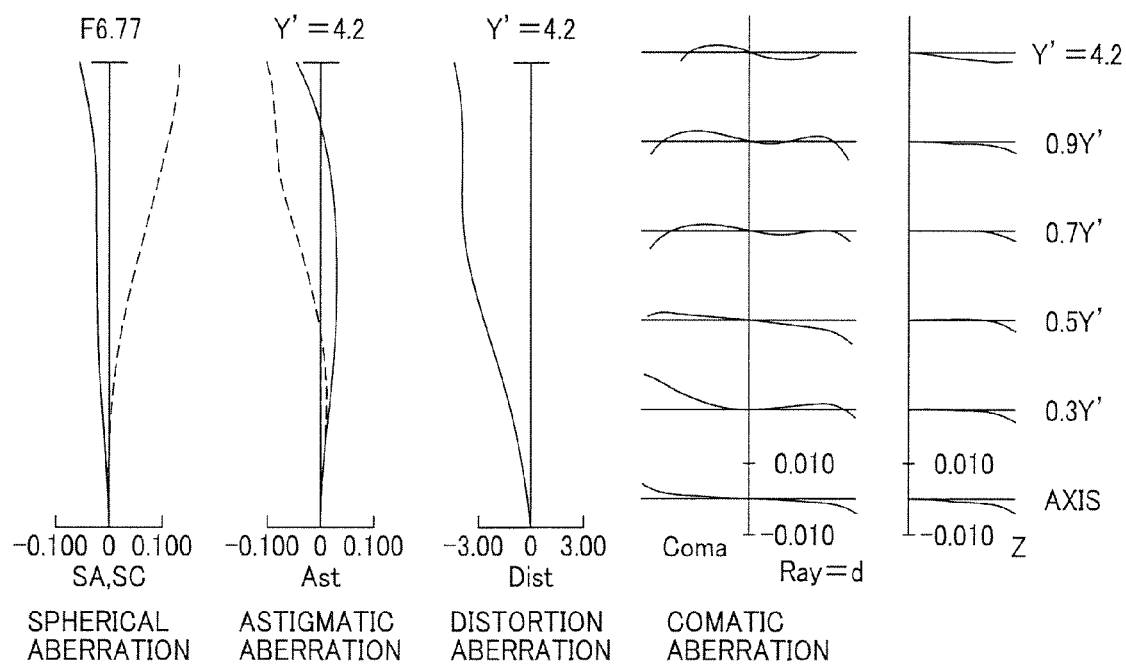
FIG. 10 is a view showing an aberration with respect to the one point telephoto of the zoom lens according to the second embodiment.

FIG. 7, FIG. 8, FIG. 9, and FIG. 10 respectively show each aberration of a wide angle end of the zoom lens according to the second embodiment FIG. 7), a specified medium focal length of the zoom lens according to the second embodiment (FIG. 8), a telephoto end of the zoom lens according to the second embodiment (FIG. 9), and a one point telephoto of the zoom lens according to the second embodiment (FIG. 10). The depictions in FIG. 7 to FIG. 10 follow the format of the depictions in FIG. 2 to FIG. 5. A solid line within each respective drawing with respect to the astigmatic aberration denotes a sagittal image surface, and a dashed line therewithin denotes a meridional image surface. The comatic aberration diagram denotes the comatic aberration with regard to each respective image height. It is to be understood that a "d" in the respective aberration diagrams denotes the aberration with respect to the "d-line," wherein λ=587.6 nm.

According to the first embodiment and the second embodiment, the present invention comprises a low pass filter, to filter out a spatial frequency above an upper bound resolution of an anchored imaging element, such as a CCD, that is positioned upon the imaging surface of the imaging apparatus, and a glass cover that protects the imaging element thereof.

As described herein, it is possible to implement a new type of zoom lens by way of the present invention. The zoom lens according to the present invention is capable of implementing a half image angle of 38 degrees or more, corresponding to a wide angle of 28 mm in terms of a focal length that is converted to a 35 mm silver halide film camera, while also achieving a magnification of 7× or more. It is thus possible to

What is claimed is:

1. A zoom lens comprising:
a first lens group configured to comprise a positive refraction index and to be anchored in place when performing a magnification of an image;
a second lens group configured to comprise a negative refraction index
a third lens group configured to comprise a positive refraction index;
a fourth lens group configured to comprise a positive refraction index;
a fifth lens group configured to comprise a negative refraction index; and
a sixth lens group configured to comprise a positive refraction index;
the first to sixth lens groups being disposed in order along an optical axis from a side nearest to a photographic subject to an imaging site,
when magnifying from a wide angle end to a telephoto end, the magnification thereof being performed by moving the second lens group, the fourth lens group, and the fifth lens group, at a minimum;
the first lens group whereof including a reflective optical element configured to refract a light path therein; and
a magnification to a long focal distance that is even longer than the telephoto end being performed by interposing, at a minimum, one additional lens group comprising a negative refraction index configured to be an additional lens group, between the lens groups of the zoom lens.

2. The zoom lens according to claim 1, wherein:
when the additional lens group is interposed between the lens groups of the zoom lens, an overall length of the zoom lens is maintained at a given length, before and after the interposition of the additional lens group therein, by moving the second lens group, the fourth lens group, and the fifth lens group, at a minimum.

3. The zoom lens according to claim 1, wherein:
the additional lens group is interposed nearer to the imaging site than the fifth lens group.

4. The zoom lens according to claim 1, wherein:
the additional lens group is configured of a plurality of lenses.

5. The zoom lens according to claim 1, wherein:
an interval of one lens group aside from the additional lens group, at a minimum, is altered.

6. The zoom lens according to claim 1, wherein:
an additional lens group is interposed between the first lens group and the second lens group, and another additional lens group is also interposed nearer to the imaging site than the fifth lens group.

7. The zoom lens according to claim 1, wherein;
symbolizing an overall focal length with respect to the wide angle end as "ft," an overall focal length with respect to the telephoto end as "fw," and an overall focal length after the interposition of the additional lens group as "ft'," a condition that follows is satisfied:

$$ft/fw \geq 5; \text{ and} \tag{1}$$

$$ft'/ft \geq 1.4. \tag{2}$$

8. An imaging apparatus comprising:
the zoom lens according to claim 1.